United States Patent [19]
Shinomura et al.

[11] Patent Number: 5,891,041
[45] Date of Patent: Apr. 6, 1999

[54] ULTRASONIC IMAGING SYSTEM ADAPTED FOR USE WITH ULTRASONIC PROBES HAVING DIFFERENT CENTER FREQUENCIES

[75] Inventors: Ryuichi Shinomura, Higashimatsuyama; Yuichi Miwa, Chofu; Satoshi Tamano, Kashiwa, all of Japan

[73] Assignee: Hitachi Medical Corporation, Tokyo, Japan

[21] Appl. No.: 977,652

[22] Filed: Nov. 24, 1997

[30] Foreign Application Priority Data

Nov. 27, 1996 [JP] Japan ..................................... 8-316233

[51] Int. Cl.$^6$ ..................................... A61B 8/00
[52] U.S. Cl. ........................................... 600/459; 600/437
[58] Field of Search ..................................... 600/437, 442, 600/459, 463, 462; 73/628; 367/7, 138, 11

[56] References Cited

U.S. PATENT DOCUMENTS

| | | | |
|---|---|---|---|
| 4,811,740 | 3/1989 | Ikeda et al. | 600/437 |
| 5,205,175 | 4/1993 | Garza et al. | 73/628 |
| 5,501,219 | 3/1996 | Phelps et al. | 600/442 |

*Primary Examiner*—Marvin M. Lateef
*Assistant Examiner*—Ali Imam
*Attorney, Agent, or Firm*—Fay, Sharpe, Beall, Fagan, Minnich & McKee

[57] ABSTRACT

Disclosed herein is an ultrasonic diagnostic apparatus employing two or more ultrasonic probes each comprising a plurality of ultrasonic transducers each for transmitting and receiving an ultrasonic wave, the ultrasonic diagnostic apparatus further comprising: a first storage means for storing only standard focus data, that is, focus data for forming received ultrasonic beams employed in a predetermined one of the ultrasonic probes; a second storage means for storing a ratio of a center frequency of the predetermined one of the ultrasonic probes to a center frequency of another one of the ultrasonic probes; and a calculation means for calculating focus data for forming received ultrasonic beams employed in the other ultrasonic probe from the standard focus data stored in the first storage means and the ratio stored in the second storage means to form an ultrasonic image from the ultrasonic waves received by the ultrasonic transducers employed in the other ultrasonic probe, wherein focus data for forming received ultrasonic beams employed in any of the ultrasonic probes is used for focusing the ultrasonic waves received by the ultrasonic transducers employed in the ultrasonic probe into pieces of digital received signal data and for delaying the pieces of digital received signal data by a predetermined delay time, and delayed pieces of digital received signal data are finally added up to form an ultrasonic image.

16 Claims, 3 Drawing Sheets

● SAMPLING POINT
● INTERPOLATE POINT 5,891,041

ULTRASONIC IMAGING SYSTEM ADAPTED FOR USE WITH ULTRASONIC PROBES HAVING DIFFERENT CENTER FREQUENCIES

BACKGROUND OF THE INVENTION

1. Field of the Invention

In general, the present invention relates to an ultrasonic diagnostic apparatus. In particular, the present invention relates to an effective ultrasonic technology applied to reduction of the amount of focus data for forming received ultrasonic beams of ultrasonic probes with center frequencies different from each other and reduction of the amount of focus data (focus data for forming received ultrasonic beams) for forming a focus of ultrasonic waves received by ultrasonic transducers of a broad-frequency-band ultrasonic probe employed in an ultrasonic diagnostic apparatus.

2. Description of the Related Art

In the conventional ultrasonic diagnostic apparatus, ultrasonic waves transmitted by a plurality of ultrasonic transducers to an object are reflected by the object and received by the ultrasonic transducers. Received signals are each amplified and are delayed by a delaying process (beam-forming process) that adjusts wavefronts coming from a focus in order to electrically converge the received signals output by the ultrasonic transducers. The delayed signals are finally added up to form an ultrasonic beam.

In addition, the focus point of ultrasonic waves received by ultrasonic transducers changes with the lapse of time through a number of stages or in a dynamic manner.

If analog processing is carried out on a received signal, a delay time deliberately introduced in the delaying process described above is converted into tap switching data of an analog delay line which is used for determining a tap on the analog delay line.

If digital processing is carried out on a received signal, on the other hand, a delay time with a predetermined length is deliberately introduced after the analog signal has been converted into digital data in an analog-to-digital conversion process. The delay method is determined in dependence upon the beam-forming technique. Typically, the delay time is introduced as follows. Pieces of digital data (digitized received-signals) are stored at a sequence of addresses in a memory and then read out from the memory starting from an address shifted from the head of the address sequence by an offset to result in a delay time $\tau_0$ corresponding to the offset. In this case, in order to provide a delay time shorter than the sampling period of the analog-to-digital conversion process, delayed digital data is obtained by interpolation of pieces of digital data read out from the memory.

In an ultrasonic diagnoses apparatus of an electronic scan type, for example, about 100 to 300 rasters are required to form a frame. The rasters are each formed by dynamic reception focusing in the transmission direction of the ultrasonic wave. An image of one frame is formed by sequential scanning in the direction.

Thus, if the number of focus steps per raster is a1, the number of ultrasonic transducers is a2 and the number of rasters is a3, as many as a1×a2×a3 pieces of focus data for forming received ultrasonic beams are required.

By the way, the conventional ultrasonic diagnostic apparatus may employ a plurality of ultrasonic probes which generally have frequencies different from each other. The examiner selects an ultrasonic probe with a frequency that is appropriate for an object to be diagnosed. Typical frequencies of ultrasonic probes are 3.5 MHz, 5 MHz, 7.5 MHz and 10 MHz.

Thus, in the conventional ultrasonic diagnostic apparatus, focus data for forming received ultrasonic beams is stored in a ROM (Read-only Memory) in advance for each ultrasonic probe employed therein. In order to form a focus of ultrasonic waves received by ultrasonic transducers employed in an ultrasonic probe, the ultrasonic probe reads out the focus data from the ROM.

In addition, an ultrasonic probe operating at frequencies over a broad frequency band is being put to use in recent years. An ultrasonic probe operating at frequencies over a broad frequency band is referred to hereafter as a broad-frequency-band ultrasonic probe. Thus, the same broad-frequency-band ultrasonic probe can be used at typically 3.5 MHz, 5 MHz or 7.5 MHz which is selected according to the object being diagnosed. The examiner sets only the center frequency of a broad-frequency-band ultrasonic probe at a desired frequency. Since the operation of a broad-frequency-band ultrasonic probe is not dependent upon the value of the center frequency, it is not necessary to adjust focus data for forming received ultrasonic beams according to the value of the center frequency in an analog beam-forming process.

If a digital beam-forming process is carried out, however, ultrasonic waves received by ultrasonic transducers are needed not only sampling delayed but also produced a delay time shorter than the sampling period. In this case, a variety of techniques such as interpolation need to be devised to produce a delay time shorter than the sampling period of the ADC. For this reason, it is necessary to re-calculate data for producing such a small delay, by which digital received signal data resulting from the analog-to-digital conversion carried out by the ADC is to be delayed, in order to form a focus of ultrasonic waves received by ultrasonic transducers.

As a result of studying the conventional technologies described above, the inventor of the present invention has identified the following problems.

In the conventional ultrasonic diagnostic apparatus employing a plurality of ultrasonic probes, there is no relation among the ultrasonic probes as far as the design and usage conditions of the ultrasonic probes are concerned. Thus, focus data for forming received ultrasonic beams employed in one ultrasonic probe is different from focus data for forming received ultrasonic beams employed in another ultrasonic probe. For this reason, in the conventional ultrasonic diagnostic apparatus, focus data for forming received ultrasonic beams needs to be provided for each ultrasonic probe. By the way, the amount of focus data for forming received ultrasonic beams for each individual ultrasonic probe is large, raising a problem of an extremely large total amount of focus data for forming received ultrasonic beams for all the ultrasonic probes.

As a result, a ROM with a large storage capacity for storing such data is required, giving rise to a problem of an increased cost of the ultrasonic diagnostic apparatus.

In addition, when a new ultrasonic probe with unknown focus data for forming received ultrasonic beams thereof is incorporated in the conventional ultrasonic diagnostic apparatus, it is necessary to calculate the data. If the focus data for forming received ultrasonic beams for the new ultrasonic probe is known, on the other hand, the data can be stored in the ROM. In this case, however, it is necessary to supply the data for finding a focus of ultrasonic waves received by ultrasonic transducers from the ROM to a controller of a beam-forming circuit for receiving such data, raising a problem of a decreased diagnosing efficiency of a physician, a typical examiner utilizing the ultrasonic diagnostic apparatus.

Even in the case of an ultrasonic diagnostic apparatus employing a single broad-frequency-band ultrasonic probe which is capable of operating at a plurality of transmission/reception frequencies, a problem of an extremely large total amount of focus data for forming received ultrasonic beams for all the transmission/reception frequencies is encountered as is the case with an ultrasonic diagnostic apparatus employing a plurality of ultrasonic probes. In addition, there are also raised a number of problems such as the necessity to calculate data required for interpolation to produce a small delay or to supply focus data for forming received ultrasonic beams stored in the ROM to a controller of a beam-forming circuit for receiving such data. As a result, there is also encountered a problem of a decreased diagnosing efficiency of a physician, a typical examiner utilizing the ultrasonic diagnostic apparatus.

SUMMARY OF THE INVENTION

It is thus an object of the present invention to provide a small-size and low-cost ultrasonic diagnostic apparatus.

It is another object of the present invention to provide a high-efficiency ultrasonic diagnostic apparatus.

It is still another object of the present invention to provide an ultrasonic diagnostic apparatus employing two or more ultrasonic probes wherein, by reducing the amount of focus data for forming received ultrasonic beams of the ultrasonic probes, the size of a data storing means for storing such data can be decreased.

It is a further object of the present invention to provide an ultrasonic diagnostic apparatus employing two or more ultrasonic probes wherein, by simplifying calculation of focus data for forming received ultrasonic beams of the ultrasonic probes, the diagnosing efficiency can be increased.

It is still another object of the present invention to provide an ultrasonic diagnostic apparatus employing a single broad-frequency-band ultrasonic probe capable of transmitting and receiving ultrasonic waves at a plurality of transmission/reception frequencies wherein, by reducing the amount of focus data for forming received ultrasonic beams of the ultrasonic probe, the size of a data storing means for storing such data can be decreased.

It is a still further object of the present invention to provide an ultrasonic diagnostic apparatus employing a single broad-frequency-band ultrasonic probe capable of transmitting and receiving ultrasonic waves at a plurality of transmission/reception frequencies wherein, by simplifying calculation of delay-time focus data for forming received ultrasonic beams of the ultrasonic probe and calculation in an interpolation process for forming a small delay, the diagnosing efficiency can be increased.

Outlines of some representative inventions disclosed in the present patent application are described in brief as follows.

According to a 1st aspect of the present invention, there is provided an ultrasonic diagnostic apparatus employing two or more ultrasonic probes each comprising a plurality of ultrasonic transducers each for transmitting and receiving an ultrasonic wave, the ultrasonic diagnostic apparatus further comprising:

a first storage means for storing only standard focus data, that is, focus data for forming received ultrasonic beams employed in a predetermined one of the ultrasonic probes;

a second storage means for storing a ratio of a center frequency of the predetermined one of the ultrasonic probes to a center frequency of another one of the ultrasonic probes; and a calculation means for calculating focus data for forming received ultrasonic beams employed in the other ultrasonic probe (that is, focus data calculated by using the standard focus data for forming a received beam) from the standard focus data stored in the first storage means and the ratio stored in the second storage means to form an ultrasonic image from the ultrasonic waves received by the ultrasonic transducers employed in the other ultrasonic probe, wherein focus data for forming received ultrasonic beams employed in any of the ultrasonic probes is used for focusing the ultrasonic waves received by the ultrasonic transducers employed in the ultrasonic probe into pieces of digital received signal data and for delaying the pieces of digital received signal data by a predetermined delay time, and delayed pieces of digital received signal data are finally added up to form an ultrasonic image.

According to a 2nd aspect of the present invention, in the ultrasonic diagnostic apparatus of a beam-forming type employing two or more ultrasonic probes each comprising a plurality of ultrasonic transducers each for transmitting and receiving an ultrasonic wave in accordance with the 1st aspect of the present invention, focus data for forming received ultrasonic beams employed in any of the ultrasonic probes is used for focusing the ultrasonic waves received by the ultrasonic transducers employed in the ultrasonic probe into pieces of digital received signal data, for multiplying each of the pieces of digital received signal data by a reference signal having the same frequency as a reception frequency, for delaying the pieces of digital received signal data of a difference-frequency component of a result of multiplying each of the pieces of digital received signal data by the reference signal and for carrying out a beam-forming process based on phase rotation on delayed pieces of digital received signal data, and the delayed pieces of digital received signal data completing the beam-forming process are finally added up to form an ultrasonic image.

According to a 3rd aspect of the present invention, in the ultrasonic diagnostic apparatus of a beam-forming type employing two or more ultrasonic probes each comprising a plurality of ultrasonic transducers each for transmitting and receiving an ultrasonic wave in accordance with the 1st aspect of the present invention, focus data for forming received ultrasonic beams employed in any of the ultrasonic probes is used for focusing the ultrasonic waves received by the ultrasonic transducers employed in the ultrasonic probe into pieces of digital received signal data by sampling each of the ultrasonic waves at a sampling frequency equal to four times a center frequency of the ultrasonic waves and for reading out the pieces of digital received signal data of a predetermined delay time from a memory at a 90-degree phase after storing the pieces of digital received signal data in the memory, and delayed pieces of digital received signal data are finally added up to form an ultrasonic image by controlling the phase of a complex signal resulting from the addition of the delayed pieces of digital received signal data.

According to a 4th aspect of the present invention, in the ultrasonic diagnostic apparatus of a beam-forming type employing two or more ultrasonic probes each comprising a plurality of ultrasonic transducers each for transmitting and receiving an ultrasonic wave in accordance with the 1st aspect of the present invention, focus data for forming received ultrasonic beams employed in each of the ultrasonic probes is used for converting a plurality of the analog ultrasonic waves received by the ultrasonic transducers each into a digital signal by means of a plurality of analog-to-digital converters, for reading out the digital signals back from a memory to delay the digital received signals by reading timing after storing the digital received signals in the memory and for forming an ultrasonic beam by implementing interpolation to produce a small delay by setting coefficients of a filter.

According to a 5th aspect of the present invention, in the ultrasonic diagnostic apparatus according to any one of the 1st to 4th aspects of the present invention, when the other ultrasonic probe with a center frequency equal to 1/h times the center frequency of the predetermined ultrasonic probe is used, a transducer-array pitch of the other ultrasonic probe is set at a value equal to h times that of the predetermined ultrasonic probe, a focus distance of the other ultrasonic probe is set at a value equal to h times that of the predetermined ultrasonic probe and a sampling frequency of the other ultrasonic probe is set at a value equal to 1/h times that of the predetermined ultrasonic probe.

According to a 6th aspect of the present invention, in the ultrasonic diagnostic apparatus according to the 2nd aspect of the present invention, when the other ultrasonic probe with a center frequency equal to 1/h times the center frequency of the predetermined ultrasonic probe is used, a transducer-array pitch of the other ultrasonic probe is set at a value equal to h times that of the predetermined ultrasonic probe, a focus distance of the other ultrasonic probe is set at a value equal to h times that of the predetermined ultrasonic probe and a sampling frequency of the other ultrasonic probe is set at a value equal to that of the predetermined ultrasonic probe.

According to a 7th aspect of the present invention, in the ultrasonic diagnostic apparatus according to the 6th aspect of the present invention, when the other ultrasonic probe with a center frequency equal to 1/h times the center frequency of the predetermined ultrasonic probe is used, time-delay data for generating a focus of ultrasonic waves received by the ultrasonic transducers employed in the other ultrasonic probe is found by multiplying that for the predetermined ultrasonic probe by h and phase-rotation data of the predetermined ultrasonic probe is used as that for the other ultrasonic probe as it is.

According to a 8th aspect of the present invention, in the ultrasonic diagnostic apparatus according to any one of the 1st to 6th aspects of the present invention, a transducer-array pitch, a focus distance and a sampling frequency of each of the ultrasonic probes are each given as a function of center frequency of the respective ultrasonic probe.

According to a 9th aspect of the present invention, there is provided an ultrasonic diagnostic apparatus of a beam-forming type employing an ultrasonic probe comprising a plurality of ultrasonic transducers each capable of transmitting and receiving an ultrasonic wave at a plurality of transmission/reception frequencies, the ultrasonic diagnostic apparatus further comprising:

a first storage means for storing focus data for forming received ultrasonic beams at a predetermined one of the transmission/reception frequencies;

a second storage means for storing a ratio of the predetermined transmission/reception frequency to another transmission/reception frequency; and a calculation means for calculating focus data for forming received ultrasonic beams at the other transmission/reception frequency from the data stored in the first storage means and the ratio stored in the second storage means to form an ultrasonic image from the ultrasonic waves received by the ultrasonic transducers at the other transmission/reception frequency, wherein focus data for forming received ultrasonic beams at any of the transmission/reception frequencies in use is used for focusing the ultrasonic waves received by the ultrasonic transducers into pieces of digital received signal data and for delaying the pieces of digital received signal data by a predetermined delay time, and delayed pieces of digital received signal data are finally added up to form an ultrasonic image.

According to a 10th aspect of the present invention, in the ultrasonic diagnostic apparatus of a beam-forming type employing an ultrasonic probe comprising a plurality of ultrasonic transducers each capable of transmitting and receiving an ultrasonic wave at a plurality of transmission/reception frequencies in accordance with the 9th aspect of the present invention, focus data for forming received ultrasonic beams at any of the transmission/reception frequencies is used for focusing the ultrasonic waves received by the ultrasonic transducers into pieces of digital received signal data, for multiplying each of the pieces of digital received signal data by a reference signal having the same frequency as a reception frequency, for delaying the pieces of digital received signal data of a difference-frequency component of a result of multiplying each of the pieces of digital received signal data by the reference signal and for carrying out a beam-forming process based on phase rotation on delayed pieces of digital received signal data, and the delayed pieces of digital received signal data completing the beam-forming process are finally added up to form an ultrasonic image.

According to a 11th aspect of the present invention, in the ultrasonic diagnostic apparatus of a beam-forming type employing an ultrasonic probe comprising a plurality of ultrasonic transducers each capable of transmitting and receiving an ultrasonic wave at a plurality of transmission/reception frequencies in accordance with the 9th aspect of the present invention, focus data for forming received ultrasonic beams at any of the transmission/reception frequencies is used for focusing the ultrasonic waves received by the ultrasonic transducers into pieces of digital received signal data by sampling each of the ultrasonic waves at a sampling frequency equal to four times a center frequency of the ultrasonic waves and for reading out the pieces of digital received signal data of a predetermined delay time back from a memory at a 90-degree phase after storing the pieces of digital received signal data in the memory, and delayed pieces of digital received signal data are finally added up to form an ultrasonic image by controlling the phase of a complex signal resulting from the addition of the delayed pieces of digital received signal data.

According to a 12th aspect of the present invention, in the ultrasonic diagnostic apparatus according to any one of the 9th to 11th aspects of the present invention, if the value of the other transmission/reception frequency in use is equal to 1/h times the predetermined transmission/reception frequency, a sampling frequency for the other transmission/reception frequency is set at a value equal to a 1/h times a sampling frequency for the predetermined transmission/reception frequency.

According to a 13th aspect of the present invention, in the ultrasonic diagnostic apparatus according to the 10th or 12th aspects of the present invention, if the value of the other transmission/reception frequency in use is equal to 1/h times the predetermined transmission/reception frequency, time-delay focus data for forming received ultrasonic beams and phase-rotation data are found by multiplying those for the predetermined transmission/reception frequency by 1/h.

According to a 14th aspect of the present invention, in the ultrasonic diagnostic apparatus according to the 11th or 12th aspects of the present invention, if the value of the other transmission/reception frequency in use is equal to 1/h times the predetermined transmission/reception frequency, time-delay focus data for forming received ultrasonic beams for the other transmission/reception frequency is found by multiplying that for the predetermined transmission/reception frequency by 1/h.

According to a 15th aspect of the present invention, in the ultrasonic diagnostic apparatus according to any one of the 8th to 11th aspects of the present invention, if the value of the other transmission/reception frequency in use is equal to 1/h times the predetermined transmission/reception frequency, a sampling frequency for the other transmission/reception frequency is set at a value equal to that for the predetermined transmission/reception frequency.

According to a 16th aspect of the present invention, in the ultrasonic diagnostic apparatus according to the 9th or 15th aspects of the present invention, if the value of the other transmission/reception frequency in use is equal to 1/h times the predetermined transmission/reception frequency, phase-rotation data for the other transmission/reception frequency is found by multiplying that for said predetermined transmission/reception frequency by 1/h.

By virtue of the ultrasonic diagnostic apparatuses according to the 1st to 8th aspects of the present invention described above, when using an ultrasonic probe other than the predetermined ultrasonic probe serving as a standard ultrasonic probe, the focus data for forming received ultrasonic beams of which is stored in the first storage means, focus data for forming received ultrasonic beams employed in the other ultrasonic probe can be calculated from the data stored in the first storage means for forming a focus of ultrasonic waves received by ultrasonic transducers employed in the predetermined standard ultrasonic probe and the ratio of the center frequency of the predetermined standard ultrasonic probe to the center frequency of the other ultrasonic probe stored in the second storage means and the calculated data can in turn be used for finding delay times of the ultrasonic diagnostic apparatus. As a result, there is exhibited an effect that the size of the means for storing focus data for forming received ultrasonic beams employed in each of the ultrasonic probes can be reduced.

In addition, since a delay time of another ultrasonic probe used as a replacement can be calculated by the calculation means, there is also exhibited an effect of simplifying calculation of delay times for forming a focus of ultrasonic waves received by ultrasonic transducers employed in the other ultrasonic probe.

As a result, the ultrasonic diagnostic apparatus can be manufactured at a low cost.

It should be noted that a later description in the present specification will explain a principle underlying the calculation of focus data for forming received ultrasonic beams employed in another ultrasonic probe from data stored in the first storage means for forming a focus of ultrasonic waves received by ultrasonic transducers employed in the predetermined standard ultrasonic probe and the ratio of the center frequency of the predetermined standard ultrasonic probe to the center frequency of the other ultrasonic probe stored in the second storage means.

By virtue of the ultrasonic diagnostic apparatuses according to the 6th and 7th aspects of the present invention described above, when an ultrasonic probe other than the predetermined ultrasonic probe serving as a standard ultrasonic probe is used with a center frequency of the former equal to 1/h times the center frequency of the latter, for example, time-delay focus data for forming received ultrasonic beams employed in the other ultrasonic probe can be calculated by multiplying the time-delay focus data for forming received ultrasonic beams employed in the predetermined standard ultrasonic probe by h while phase-rotation data for the predetermined standard ultrasonic probe can be used as it is as phase-rotation data for the other ultrasonic probe. Thus, the focus data for forming received ultrasonic beams employed in the other ultrasonic probe can be calculated with ease.

As a result, since the focus data for forming received ultrasonic beams employed in the other ultrasonic probe can be calculated in a short period of time, the time it takes to display an ultrasonic image obtained as a result of the examination can be shortened, increasing the diagnosing efficiency of the physician, a typical user of the ultrasonic diagnostic apparatus.

By virtue of the ultrasonic diagnostic apparatuses according to the 6th and 7th aspects of the present invention described above, when an ultrasonic probe other than the predetermined ultrasonic probe serving as a standard ultrasonic probe is used with a center frequency of the former equal to 1/h times the center frequency of the latter, for example, time-delay focus data for forming received ultrasonic beams employed in the other ultrasonic probe can be calculated by multiplying the time-delay focus data for forming received ultrasonic beams employed in the predetermined standard ultrasonic probe by h. Thus, the focus data for forming received ultrasonic beams employed in the other ultrasonic probe can be calculated with ease. As a result, since the focus data for forming received ultrasonic beams employed in the other ultrasonic probe can be calculated in a short period of time, the time it takes to display an ultrasonic image obtained as a result of examination can be shortened, increasing the diagnosing efficiency of the physician, a typical user of the ultrasonic diagnostic apparatus.

By virtue of the ultrasonic diagnostic apparatuses according to the 9th to 16th aspects of the present invention described above, when using an ultrasonic probe other than the predetermined ultrasonic probe serving as a standard ultrasonic probe, the focus data for forming received ultrasonic beams of which is stored in the first storage means, focus data for forming received ultrasonic beams employed in the other ultrasonic probe can be calculated from the data stored in the first storage means for forming a focus of ultrasonic waves received by ultrasonic transducers employed in the predetermined standard ultrasonic probe and the ratio of the center frequency of the predetermined standard ultrasonic probe to the center frequency of the other ultrasonic probe stored in the second storage means. As a result, there is exhibited an effect that it is possible to reduce the size of the means for storing focus data for forming received ultrasonic beams employed in a broad-frequency-band ultrasonic probe wherein the transmission/reception center frequency thereof is changed or in an ultrasonic probe wherein the transmission/reception frequency thereof is changed in the doppler mode.

As a result, the ultrasonic diagnostic apparatus can be manufactured at a low cost.

Effects provided by the representative inventions disclosed in the present patent application are described in brief as follows.

(1) It is possible to reduce the amount of focus data for generating a focus of ultrasonic waves received by ultrasonic transducers in an ultrasonic diagnostic apparatus employing two or more ultrasonic probes.

(2) It is possible to simplify computation of focus data for forming received ultrasonic beams in an ultrasonic diagnostic apparatus employing two or more ultrasonic probes.

(3) It is possible to reduce the amount of focus data for generating a focus of ultrasonic waves received by ultrasonic transducers in an ultrasonic diagnostic apparatus employing a broad-frequency-band ultrasonic probe that is capable of transmitting and receiving ultrasonic waves at a plurality of transmission/reception frequencies.

(4) It is possible to simplify calculation of focus data for forming received ultrasonic beams and to simplify interpolation for finding a small delay in an ultrasonic diagnostic apparatus employing a broad-frequency-band ultrasonic probe that is capable of transmitting and receiving ultrasonic waves at a plurality of transmission/reception frequencies.

BRIEF DESCRIPTION OF THE DRAWINGS

The description given so far, other objects and new features of the present invention will become apparent from the following explanation with reference to the following drawings wherein.

DETAILED DESCRIPTION OF THE PREFERRED EMBODIMENTS

Principle of Operation

Figure 1A:
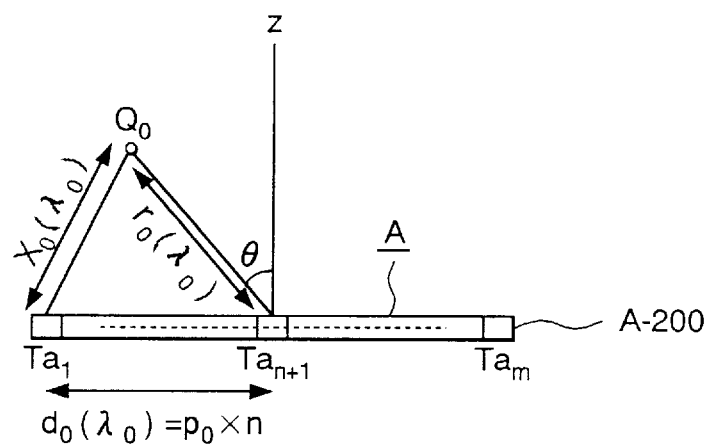
FIG. 1A is a diagram used for explaining computation of a focus of ultrasonic waves received by ultrasonic transducers employed in a standard ultrasonic probe A.
Figure 1B:
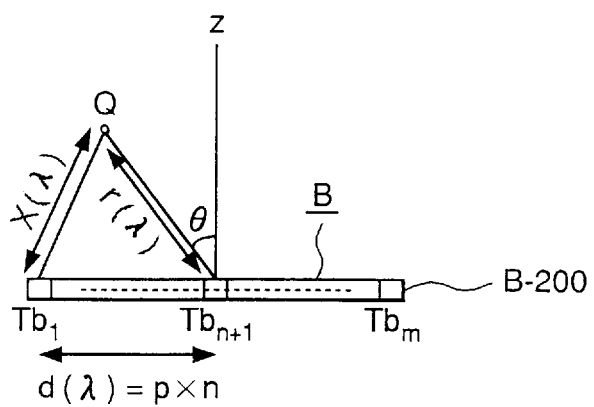
FIG. 1B is a diagram used for explaining computation of a reception focus of ultrasonic waves received by ultrasonic transducers employed in an arbitrary ultrasonic probe B.

FIG. 1A is a diagram used for explaining computation of a focus of ultrasonic waves received by ultrasonic transducers employed in a standard ultrasonic probe A and FIG. 1B is a diagram used for explaining computation of a reception focus of ultrasonic waves received by ultrasonic transducers employed in an arbitrary ultrasonic probe B. The principle of the present invention is explained by referring to FIGS. 1A and 1B as follows.

As shown in FIG. 1A, the standard ultrasonic probe A is an array A-200 of m ultrasonic transducers $T_{a1}$ to $T_{am}$. Assume that the center frequency of the ultrasonic probe A is $f_0$, the sampling frequency is $fs_0$ and the ultrasonic transducer pitch, strictly speaking, the transducer-array pitch, of the ultrasonic probe A is $P_0$. Let the focus distance, that is, a distance from an ultrasonic transducer $T_{an+1}$ at in middle of the array, that is, a reference ultrasonic transducer, to a focus point $Q_0$ be $r_0$, a beam direction for the ultrasonic transducer $T_{an+1}$ be $\theta$ and the notation $\lambda$ shown in the figure denotes the ultrasonic wavelength. In this case, the distance $X_0$ from the ultrasonic transducer $T_{a1}$ at the left end of the array to the focus point $Q_0$ is expressed by Eq. (1) as follows.

$$X_0 = \sqrt{(r_0 \cdot \cos\theta)^2 + (p_0 \cdot n + r_0 \cdot \sin\theta)^2} \quad (1)$$

$$= \sqrt{r_0^2 + d_0^2 + 2(r_0 \cdot d_0)\sin\theta}$$

where $d_0 = P_0 \times n$.

Assume that the velocity of sound in the medium is $V_{e1}$. In this case, the difference in arrival time $\tau_0$ between wavefronts at the ultrasonic transducers $T_{an+1}$ and $T_{a1}$ is expressed by Eq. (2) as follows:

$$\tau_0 = (x_0 - r_0)/v_{e1} \quad (2)$$

That is to say, a reflected signal from the focus point $Q_0$ arrives at the ultrasonic transducer $T_{a1}$ earlier than a reflected signal arriving at the reference ultrasonic transducer $T_{an+1}$ by the arrival-time difference $\tau_0$. It is thus necessary to add the arrival-time difference $\tau_0$ to the propagation time of the reflected signal arriving at the ultrasonic transducer $T_{a1}$ in order to find the focus of the incoming ultrasonic waves.

Assume that the center frequency f of the other ultrasonic probe B shown in FIG. 1B is 1/h times the center frequency $f_0$ of the standard ultrasonic probe A shown in FIG. 1A ($f=f_0/h$). As design and application conditions of the ultrasonic probe B, the transducer-array pitch P, the focus distance r and the sampling frequency fs are expressed as follows:

$$P = h \times P_0, \ r = h \times r_0 \text{ and } fs = fs_0/h$$

The distance x from an ultrasonic transducer $T_{b1}$ at the left end of the array to a reference ultrasonic transducer $T_{bn+1}$ in the middle of the array of the ultrasonic probe shown in FIG. 1B is expressed by Eq. (3) as follows:

$$X = \sqrt{(r_0 \cdot h)^2 + (p_0 \cdot h \cdot n)^2 + 2(r_0 \cdot h \cdot p_0 \cdot n \cdot h)\sin\theta} \quad (3)$$

$$= h \sqrt{r_0^2 + d_0^2 + 2(r_0 \cdot d_0)\sin\theta}$$

$$= h \cdot x_0$$

A distance difference (x−r) can be transformed into a difference $\tau$ in arrival time between ultrasonic waves hitting the ultrasonic transducer $T_{b1}$ at the left end of the array and the reference ultrasonic transducer $T_{bn+1}$ in the middle of the array of the ultrasonic probe B by Eq. (4) as follows:

$$\begin{aligned}\tau &= (x - r)/v_{e1} \quad (4)\\ &= (h \cdot x_0 - h \cdot r_0)/v_{e1}\\ &= h(x_0 - r_0)/v_{e1}\\ &= h \cdot \tau_0\end{aligned}$$

Thus, the arrival-time difference (the delay time) $\tau$ for the other ultrasonic probe B is h times the delay time $\tau_0$ for the standard ultrasonic probe A. For this reason, the delay time $\tau$ for the other ultrasonic probe B can be calculated by multiplication of $\tau_0$ by the value of h.

The present invention will become more apparent from a careful study of the following detailed description of some preferred embodiments with reference to the accompanying diagrams.

It should be noted that, in the following description of the embodiments, elements having functions identical with each other are denoted by the same reference numeral in the diagrams used for explaining the embodiments and the elements are explained only once.

First Embodiment

Figure 2:
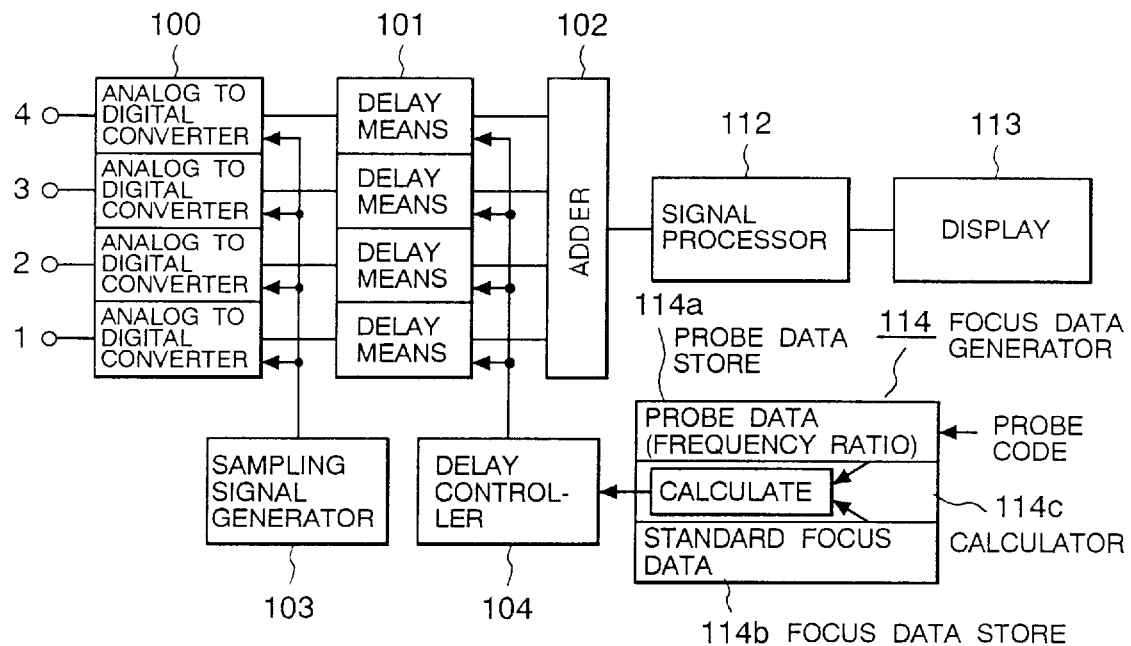
FIG. 2 is a block diagram showing the configuration of a signal processing unit of an ultrasonic diagnostic apparatus implemented by a first embodiment in a simple and plain manner.

FIG. 2 is a block diagram showing the configuration of a signal processing unit of an ultrasonic diagnostic apparatus implemented by a first embodiment in a simple and plain manner. In the figure, reference numerals 100 and 101 denote an ADC (an A/D converter or an analog-to-digital converter) and a delay means respectively. Reference numeral 102 is an adder and reference numeral 103 denotes a sampling-signal generator. Reference numerals 104 and 112 are a delay controller and a signal processor respectively. Reference numeral 113 denotes a display unit whereas reference numeral 114 is a focus-data generator. Reference numerals 114a and 114b denote an ultrasonic probe-data storing unit (a second storage means) and a focus-data storing unit (a first storage means). Reference numeral 114c is a calculator (a computation means).

As shown in the figure, in the present embodiment, four ultrasonic transducers 1 to 4 are employed in the ultrasonic probe in order to make the explanation simple. That is to say, the present embodiment implements a four-channel phasing circuit where a channel is defined as a receiving/delaying circuit connected to an ultrasonic transducer.

It should be noted, however, that the description is not intended to be construed in a limiting sense. That is to say, the scope of the present invention is not limited to four channels. It is needless to say that the present invention can be applied to an ultrasonic probe with a phasing circuit (beam forming circuit) having a channel count other than four.

It is worth noting that, as the ADC 100, the delay means 101, the adder 102, the sampling-signal generator 103, the signal processor 112 and the display unit 113, generally known means or mechanisms can be employed.

In addition, in the description of the ultrasonic diagnostic apparatus implemented by the first embodiment, the focus-data generator 114 and the delay controller 104 each having a configuration different from the conventional ultrasonic diagnostic apparatus are specially explained in detail.

In the signal processing unit shown in FIG. 2, the delay controller 104 controls a read address of received data stored in the delay means 101, which is implemented by a memory such as an SRAM, on the basis of focus data for generating a focus of ultrasonic waves received by ultrasonic transducers output by the focus-data generator 114.

As shown in FIG. 2, the focus-data generator 114 comprises the ultrasonic probe-data storing unit (a second storage means) 114a for storing ultrasonic probe data, the focus-data storing unit (a first storage means) 114b for storing data for generating a focus of ultrasonic waves received by ultrasonic transducers of a standard ultrasonic probe (a predetermined ultrasonic probe) and the calculator 114c for computing the focus of ultrasonic waves received by ultrasonic transducers of the ultrasonic probe used by the examiner from the ultrasonic probe data and the data for generating a focus of ultrasonic waves received by ultrasonic transducers.

The ultrasonic probe data stored in the ultrasonic probe-data storing unit 114a includes the center frequency of the ultrasonic probe which was set in advance at the factory at the time the ultrasonic probe was shipped and frequency ratios of the center frequency to center frequencies of ultrasonic probes connectable to the ultrasonic diagnostic apparatus. The calculator 114c reads out a frequency ratio in accordance with an ultrasonic probe code supplied to the focus-data generator 114.

It should be noted that the ultrasonic probe code varies from ultrasonic probe to ultrasonic probe. When the examiner selects an ultrasonic probe in use by operating an operation panel not shown in the figure, the ultrasonic probe code of the selected ultrasonic probe is supplied to the focus-data generator 114.

The focus-data storing unit 114b is used for storing data for generating a focus of ultrasonic waves received by ultrasonic transducers of the ultrasonic probe which was set in advance at the factory at the time the ultrasonic probe was shipped. The focus-data storing unit 114b outputs data for generating a focus of ultrasonic waves received by ultrasonic transducers to the calculator 114c at a request made by the calculator 114c.

The calculator 114c computes delay-time data of a focus of ultrasonic waves received by ultrasonic transducers of the ultrasonic probe such as a read address required in delay control from a center-frequency ratio supplied thereto by the ultrasonic probe-data storing unit 114a and factory-set data for generating a focus of ultrasonic waves received by ultrasonic transducers of the ultrasonic probe supplied thereto by the focus-data storing unit 114b. A result of the calculation is supplied to the delay controller.

Next, the operation of the ultrasonic diagnostic apparatus implemented by the first embodiment is explained by referring to FIG. 2.

It should be noted that, in the operation described below, measurement is carried out first by using the ultrasonic probe A before measurement by means of the ultrasonic probe B.

The ADC 100 carries out a sampling operation at a sampling frequency determined by a sampling signal (sampling clock) output by the sampling-signal generator 103 in order to convert an ultrasonic signal received by an ultrasonic transducer associated with the ADC 100 into pieces of digital received signal data. The pieces of digital received signal data is then written into the delay means (memory) 101 sequentially one after another by the delay controller 104. Later on, as a predetermined period of time lapses, an operation to read digital received signal data for all the channels simultaneously from the delay means 101 based on a read instruction issued by the delay controller 104 is started. The focus-data generator 114 supplies data required to generate a focus of ultrasonic waves received by ultrasonic transducers such as a read address to the delay controller 104 before the delay controller starts its operation. In the first embodiment, the read address is an address obtained to delay time with typically an address for the second channel taken as a reference.

To put it in detail, in the first embodiment, received data of the second channel is first read out from a read address. Then, data of a next channel is read out from an address obtained by adding the address offset to the read address of the second channel. Data of other channels is read out from addresses each calculated by addition of an address offset in the same way. In this way, pieces of received signal data required to generate a focus of ultrasonic waves received by ultrasonic transducers can be obtained.

Then, the pieces of received signal data are added up by the adder 102 before being supplied to the signal processor 112. In the signal processor 112, the received signal data output by the adder 102 undergoes a variety of processes such as detection, compression, enhancement and various kinds of filter processing before formation of a tomography image, a doppler image or a color doppler image by means of a DSC (Digital Scan Converter). Finally, the data is output to the display unit 113 to be displayed thereon.

In the operation described above, an address offset output by the focus-data generator 114 is used for generating a delay time. It is thus necessary to quantize an address at which received data is read out from the delay means 101 at a sampling period T equal to the reciprocal of the sampling frequency.

Now, assume that the sampling period of the standard ultrasonic probe A is $T_0$ and the delay time thereof is $\tau_0$. In this case, the address offset $A_0$ to be generated by the focus-data generator 114 is expressed by Eq. (5) as follows:

$$A_0 = \text{Round}(\tau_0/T_0) \quad (5)$$

Next, as a result of the diagnosis carried out by using the standard ultrasonic probe A, a diagnosis is performed by means of the ultrasonic probe B which has a center frequency different from that of the standard ultrasonic probe A. According to the principle described above, the address offset A used for generating of a delay time for finding a focus of ultrasonic waves received by ultrasonic transducers of the ultrasonic probe B is expressed by Eq. (6) as follows:

$$A = \text{Round}(\tau/T) \quad (6)$$

For the ultrasonic probe B, the center frequency f is $1/h$ times the center frequency $f_0$ of the standard ultrasonic probe A ($f=f_0/h$), the transducer-array pitch P is h times the transducer-array pitch $P_0$ of the standard ultrasonic probe A ($P=h \times P_0$) and the sampling frequency fs ($=1/T$) is $1/h$ times the sampling frequency $fs_0$ ($=1/T_0$) of the standard ultrasonic probe A ($fs=fs_0/h$). Thus, $T=hT_0$. According to Eq. (4), $\tau=h \times \tau_0$. Substituting $hT_0$ for T and $h \times \tau_0$ for $\tau$ in Eq. (6) results in Eq. (7) as follows:

$$A = \text{Round}(\tau_0/T_0) = A_0 \quad (7)$$

It is obvious from Eq. (7) that the address offset for generating a delay time for forming a focus of ultrasonic waves received by the ultrasonic transducers does not change ($A=A_0$). If the sampling frequency is kept unchanged ($fs=fs_0$), however, the sampling period is also unchanged ($T=T_0$). Substituting $T_0$ for T and $h \times \tau_0$ for $\tau$ in Eq. (6) results in Eq. (8) as follows:

$$A = \text{Round}(h \cdot \tau_0/T_0) \quad (8)$$

It is obvious from Eq. (8) that the address offset A for generating a delay time for forming a focus of ultrasonic waves received by the ultrasonic transducers of the ultrasonic probe B is h times the address offset $A_0$ (=Round $\tau_0/T_0$)) for generating a delay time for forming a focus of ultrasonic waves received by the ultrasonic transducers of the standard ultrasonic probe A. At any rate, even when the standard ultrasonic probe A is replaced by the ultrasonic probe B, the address offset for the ultrasonic probe B can be calculated with ease without the need to carry out calculation resorting to Eq. (6).

As described above, even when the standard ultrasonic probe A is replaced by the ultrasonic probe B, the address offset for the ultrasonic probe B can be obtained with ease without the need to carry out calculation resorting to Eq. (6) regardless of whether the sampling frequency fs, that is, the reciprocal of the sampling period T, is fixed or changed.

In the conventional ultrasonic diagnostic apparatus, it is necessary to store focus data for forming received ultrasonic beams for both the ultrasonic probes A and B in a memory. By using the ultrasonic diagnostic apparatus implemented by the first embodiment of the present invention as explained above, however, it is necessary to store only focus data for forming received ultrasonic beams for the standard ultrasonic probe A. Focus data for forming received ultrasonic beams of the ultrasonic probe B can be found by either multiplying the focus data for forming received ultrasonic beams of the standard ultrasonic probe A by a predetermined coefficient h where h is a ratio of the center frequency of the standard ultrasonic probe A to the center frequency of the other ultrasonic probe B, or using the data for finding a focus of ultrasonic waves received by the ultrasonic transducers of the standard ultrasonic probe A as it is. Thus, it is necessary to store only the center-frequency ratio h in the ultrasonic probe-data storing unit 114a and to store only the focus data for forming received ultrasonic beams of the standard ultrasonic probe A in the focus-data storing unit 114b. Focus data for forming received ultrasonic beams of the ultrasonic probe B can be found by either multiplying the focus data for forming received ultrasonic beams of the standard ultrasonic probe A read out from the focus-data storing unit 114b by the center-frequency ratio h stored in the ultrasonic probe-data storing unit 114a, or using the focus data for forming received ultrasonic beams read out from the focus-data storing unit 114b for the standard ultrasonic probe A as it is.

As a result, there is resulted in an effect that the size of the focus-data storing unit 114b can be reduced.

In addition, a read-address offset representing a delay time after replacing the standard ultrasonic probe A with the ultrasonic probe B can be calculated by using a simple formula expressed by Eq. (8), resulting in an effect that the calculation of a delay time for generating a focus of ultrasonic waves received by ultrasonic transducers can be simplified.

To explain this effect in detail, assume an ultrasonic diagnostic apparatus employing three ultrasonic probes each comprising m ultrasonic transducers. In the case of the conventional ultrasonic diagnostic apparatus, as many as 3×m pieces of data for generating a focus of ultrasonic waves received by ultrasonic transducers are required. With the ultrasonic diagnostic apparatus provided by the first embodiment of the present invention, on the other hand, only (m+2) pieces of data for generating a focus of ultrasonic waves received by ultrasonic transducers are required, showing a decrease in data-piece count from the 3×m pieces.

If data for generating a focus of ultrasonic waves received by ultrasonic transducers of the ultrasonic probe A is rounded up or truncated, a delay time obtained by multiplying the rounded-up or truncated data by the center-frequency ratio as described above will probably have its accuracy degraded to a certain degree. The degradation of the data accuracy has an effect on the beam. In order to confine the effect within an allowable range, the standard sampling frequency $f_0$ is set at a predetermined value. In order to obtain a sufficient accuracy at a frequency of 20 MHz, for example, a sampling clock of 40 MHz is taken as a standard to give an accuracy of the delay time within an allowable range. In addition, it is needless to say that the accuracy of the data for generating a focus of ultrasonic waves received by ultrasonic transducers can be sustained by storing the data before quantization through a rounding-up or truncating operation and then quantizing the data after multiplication by the center-frequency ratio.

Second Embodiment

Figure 3:
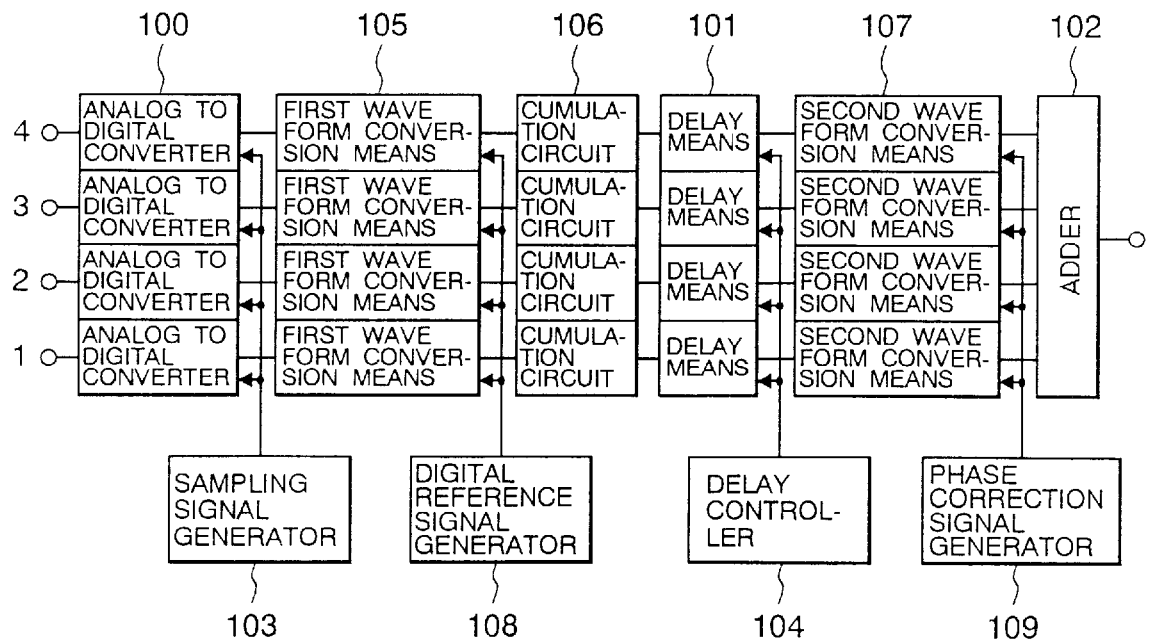
FIG. 3 is a block diagram showing the configuration of a signal processing unit of an ultrasonic diagnostic apparatus implemented by a second embodiment in a simple and plain manner.

FIG. 3 is a block diagram showing the configuration of the signal processing unit of an ultrasonic diagnostic apparatus implemented by a second embodiment in a simple and plain manner. In the figure, reference numerals 105 and 106 denote a first ultrasonic waveform conversion means (mixing circuit) and a cumulation circuit (filtering means)

respectively. Reference numeral 107 is a second ultrasonic waveform conversion means (phase rotation circuit) and reference numeral 108 denotes a digital reference signal generator. Reference numeral 109 is a phase correction signal generator.

It should be noted that the elements composing the second embodiment cited above are each implemented by a generally known component.

The following is detailed description of operations having something to do with the delay controller 104 having a configuration and a function different from that employed in the conventional ultrasonic diagnostic apparatus and explanation of the operation of the ultrasonic diagnostic apparatus implemented by a second embodiment with reference to FIG. 3. In the following description, the sampling frequency is assumed to have a fixed value.

In the case of the present embodiment, the number of ultrasonic transducers 200 is m where m is an integer equal to or greater than unity. Ultrasonic waves from a target focus are received by the ultrasonic transducers 200 at different wavefront arrival times. Each of the received analog signals is converted into digital received signal data by the ADC 100 before being supplied to the first waveform conversion means 105. In the analog-to-digital conversion carried out by the ADC 100, the signal is sampled at the frequency $fs_0$ of the sampling clock signal where, according to Nyquist's theorem, $fs_0 \geq 2f_0$.

The digital reference signal generator 108 outputs reference signals $\cos(\omega_0 t)$ and $\sin(\omega_0 t)$, where $\omega_0 = 2\pi f_0$, to the first waveform conversion means 105 for use in a mixing process. To put it in detail, in the first waveform conversion means 105, the received signal data is multiplied by the reference signals to produce a complex signal with a shifted frequency.

Then, after a sum-frequency component has been eliminated from the complex signal by the cumulation circuit 106, a difference-frequency component of the complex signal is delayed by the delay means 101 under control of the delay controller 104. It should be noted that the cumulation circuit 106 can be implemented by low-pass filters provided for real and imaginary parts of the difference-frequency component whereas the delay means 101 are provided for the real and imaginary parts. After being delayed, the difference-frequency component is supplied to the second ultrasonic waveform conversion means 107 (serving as a phase rotator) to generate a real-part signal R and an imaginary-part signal I which have been delayed slightly by a phase rotation occurring in the second ultrasonic waveform conversion means 107. The amount of the phase rotation is determined by phase-rotation data supplied by the phase correction signal generator 109 to the second ultrasonic waveform conversion means 107.

The real-part signal R and the imaginary-part signal I which have been delayed slightly by the second ultrasonic waveform conversion means 107 are then supplied to the adder 102. Subsequently, much like the first embodiment, a signal generated by the adder 102 is output to the signal processor before being supplied finally to the display unit. It should be noted, however, that the signal processor and the display unit are not shown in the figure.

At that time, assume that the difference in arrival time between an wavefront of the first ultrasonic transducer $T_{a1}$ at the left end of the ultrasonic transducer array of the standard ultrasonic probe A and an wavefront of the reference ultrasonic transducer $T_{an+1}$ in the middle of the ultrasonic transducer array is $\tau_0$. In this case, the phase-rotation angle $\phi_0$ of the phase-rotation data is $\omega_0 \times \tau_0$ ($\phi_0 = \omega_0 \times \tau_0$) where $\omega_0 = 2\pi f_0$. Thus, the phase-rotation data is $\cos(\phi_0)$ and $\sin(\phi_0)$.

Next, consider a case in which the standard ultrasonic probe A is replaced by another ultrasonic probe B much like the first embodiment described previously. In this case, the focus data for forming received ultrasonic beams for the delay means 101 is the same as the first embodiment. On the other hand, the phase-rotation angle $\phi$ of the phase-rotation data for the other ultrasonic probe B is expressed by Eq. (9) as follows.

$$\phi_0 = \tau_0 \cdot 2 \cdot \pi \cdot f_0$$

$$\tau_0 = \phi_0 / (2 \cdot \pi \cdot f_0)$$

Thus, $$\phi = \tau \cdot 2 \cdot \pi \cdot f$$

$$= h \cdot \tau_0 \cdot 2 \cdot \pi \cdot f$$

$$= h \cdot 2 \cdot \pi \cdot f \cdot \phi_0 / (2 \cdot \pi \cdot f_0)$$

$$= \phi_0 \qquad (9)$$

As is obvious from Eq. (9), the phase-rotation data does not depend on the sampling frequency, remaining unchanged in a configuration with a transducer-array pitch and a focus distance h times those of the standard ultrasonic probe A. That is to say, the phase-rotation data of the standard ultrasonic probe A can be used as it is. Much like the first embodiment, the time delay for the other ultrasonic probe B is h times that of the standard ultrasonic probe A for the same sampling frequency or the same as that of the standard ultrasonic probe A for a sampling frequency of the other ultrasonic probe B equal to 1/h times that of the standard ultrasonic probe A.

Comparison of Eqs. (1), (2) and (5) for the standard ultrasonic probe A with Eqs. (3), (4) and (8) for the other ultrasonic probe B indicates that data for the other ultrasonic probe B can be obtained by multiplying the data for the standard ultrasonic probe A by the ratio h. Thus, for a sampling frequency of the other ultrasonic probe B equal to that of the standard ultrasonic probe A, the delay time for the other ultrasonic probe B can be calculated by using only Eq. (8). The phase-rotation angle $\phi$ ($= \omega \times \tau$) for the other ultrasonic probe B is also equal to that of the standard ultrasonic probe A as indicated by Eq. (9).

In the conventional ultrasonic diagnostic apparatus, it is necessary to store data for finding a focus of ultrasonic waves received by ultrasonic transducers of both the ultrasonic probes A and B in a memory. By using the ultrasonic diagnostic apparatus implemented by the second embodiment of the present invention as explained above, however, it is necessary to store only focus data for forming received ultrasonic beams of the standard ultrasonic probe A. Data for generating a focus of ultrasonic waves received by ultrasonic transducers to be used in the delay means 101 employed in the other ultrasonic probe B can be found by either multiplying the focus data for forming received ultrasonic beams of the standard ultrasonic probe A by the predetermined coefficient h or using the focus data for forming received ultrasonic beams of the standard ultrasonic probe A as it is. As for the phase-rotation data, the data for the standard ultrasonic probe A can be used as it is. As a result, the size of a memory for storing data for generating a focus of ultrasonic waves received by ultrasonic transducers in the other ultrasonic probe B can be reduced.

To explain the above effect in detail, assume an ultrasonic diagnostic apparatus employing three ultrasonic probes each comprising m ultrasonic transducers. In the case of the conventional ultrasonic diagnostic apparatus, as many as 3×m pieces of data for generating a focus of ultrasonic waves received by ultrasonic transducers are required. With the ultrasonic diagnostic apparatus provided by the second embodiment of the present invention, on the other hand, only (m+2) pieces of data for generating a focus of ultrasonic waves received by ultrasonic transducers are required, showing a decrease in data-piece count from the 3×m pieces.

If data for generating a focus of ultrasonic waves received by ultrasonic transducers of the ultrasonic probe A is rounded up or truncated, a delay time obtained by multiplying the rounded-up or truncated data by the center-frequency ratio as described above will probably have its accuracy degraded to a certain degree. The degradation of the data accuracy has an effect on the beam. In order to confine the effect within an allowable range, the standard sampling frequency $f_0$ is set at a predetermined value. In order to obtain a sufficient accuracy at a frequency of 20 MHz, for example, a sampling clock of 40 MHz is taken as a standard to give an accuracy of the delay time within an allowable range. In addition, it is needless to say that the accuracy of the data for generating a focus of ultrasonic waves received by ultrasonic transducers can be sustained by storing the data before quantization through a rounding-up or truncating operation and then quantizing the data after multiplication by the center-frequency ratio.

It should be noted that, in the case of a 90-degree sample, the sampling frequency of the other ultrasonic probe B is 1/h times that of the standard ultrasonic probe A. In this case, the delay time and phase rotation data for the other ultrasonic probe B is the same as that of the standard ultrasonic probe A as indicated by Eq. (7), (9).

Third Embodiment

Figure 4:
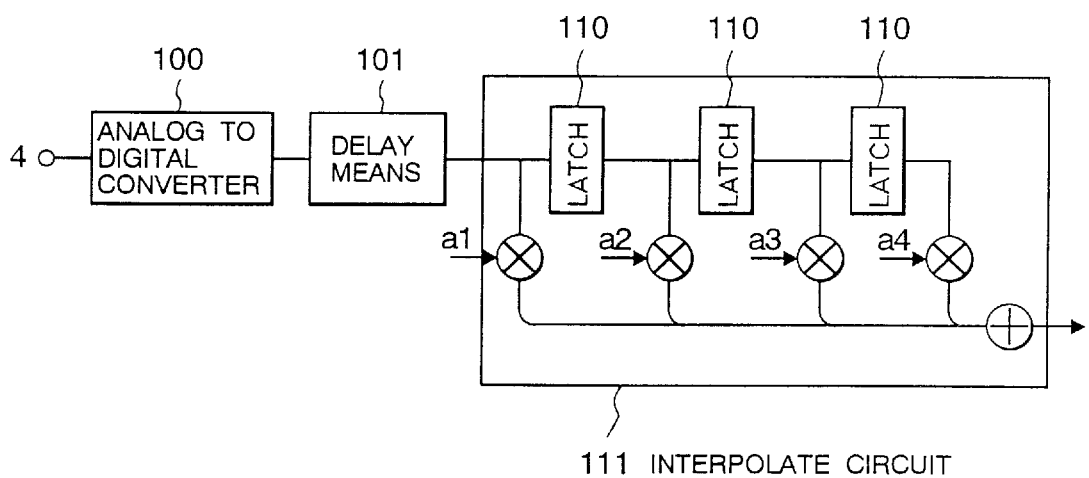
FIG. 4 is a block diagram showing the configuration of a signal processing unit of an ultrasonic diagnostic apparatus implemented by a third embodiment in a simple and plain manner.

FIG. 4 is a block diagram showing the configuration of the signal processing unit of an ultrasonic diagnostic apparatus implemented by a third embodiment in a simple and plain manner. In the figure, reference numerals 110 and 111 denote a latch and an interpolation circuit respectively.

It should be noted that the elements composing the third embodiment cited above are each implemented by a generally known component.

The following is detailed description of operations having something to do with the delay controller 104 having a configuration and a function different from that employed in the conventional ultrasonic diagnostic apparatus and explanation of the operation of the ultrasonic diagnostic apparatus implemented by a third embodiment with reference to FIG. 4.

An ultrasonic wave received from a target focus through an ultrasonic transducers is converted into digital received signal data by the ADC 100 at a sampling frequency fs before being supplied to the delay means 101 for delaying the ultrasonic wave by a delay time in a range of a multiple of the sampling period T. The delayed signal is then supplied to the interpolation circuit 111 for further delaying the signal by a delay time smaller than the sampling circuit T.

In the interpolation circuit 111, pieces of delayed data of a received signal separated from each other by the sampling period T are held in the latches 110 to be used as interpolation data by filtering based on a sampling function. The sampling function is expressed by Eq. (10) as follows:

$$S(t_n) = \sum_{k=1}^{l} S_k \frac{\sin \pi \left( \frac{n}{N} - k \right)}{\pi \left( \frac{n}{N} - k \right)} \quad (10)$$

Figure 5:
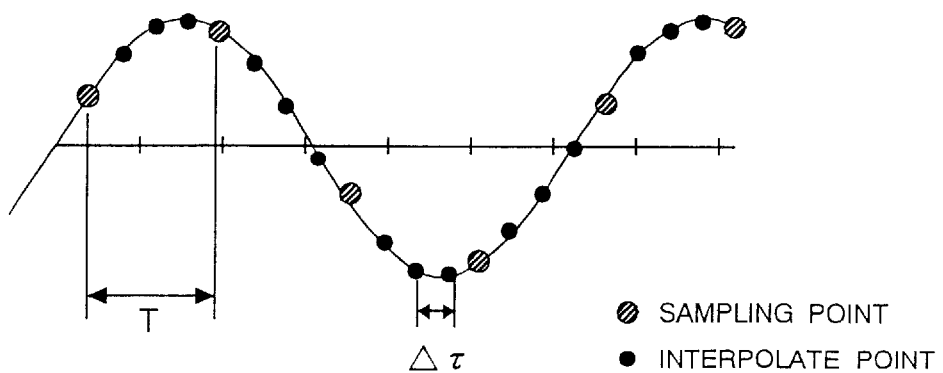
FIG. 5 is a diagram used for explaining convolution of received data by using a sampling function.

FIG. 5 is a diagram used for explaining the filter of the received data by using the sampling function. The following is description of the filter carried out in the present embodiment with reference to FIG. 5 for a case in which the sampling frequency of the other ultrasonic probe B is 1/h times that of the standard ultrasonic probe A.

Horizontal and vertical axes of the diagram showing a curve of data of a received signal represent the time and the amplitude respectively. In particular, whitish circles on the curve each represent a piece of data of the received signal sampled at a sampling point. On the other hand, three black circles on the curve between two consecutive whitish circles are each a piece of interpolated data for an interpolation-point count of 4 (N=4). Assume that the required time-delay accuracy is $\Delta\tau$ for the sampling period T. In this case, the number of interpolation points N, where N is an integer, is given by Eq. (11) as follows:

$$N = T/\Delta\tau \quad (11)$$

By substituting Eq. (11) to Eq. (10), the signal $S(t_n)$ can be found as a function of n and N. Notation j used in Eq. (10) is the number of stages in the interpolation circuit 111. The time-delay accuracy $\Delta\tau$ which determines the performance of an ultrasonic beam is proportional to the center frequency of the received signal.

To put it in detail, for example, assume that the sampling frequency is $4f_0$, where $f_0$ is the center frequency of the received signal represented by the solid-line curve shown in FIG. 5, the number of interpolation points is four (N=4) and the number of stages in the interpolation circuit is two (j=2). In this case, the time-delay accuracy $\Delta\tau$ is 1/16 the ultrasonic wavelength accuracy.

Next, consider a case in which the standard ultrasonic probe A is replaced by another ultrasonic probe B much like the first and second embodiments described previously. In this case, the data of a focus of ultrasonic waves received by ultrasonic transducers for the delay means 101 is the same as the first and second embodiments.

On the other hand, coefficients a1 to a4 supplied to multipliers employed in the interpolation circuit 111 have values described as follows. Delay times for the standard ultrasonic probe A and the other ultrasonic probe B are given by Eqs. (2) and (4) respectively. A small delay generated by the standard ultrasonic probe A is expressed by Eq. (12) as follows:

$$\Delta\times\tau_0 = \tau_0 - zT_0 \quad (12)$$

where notation z is an integer, notation T0 is a delay equal to the sampling period T and notation $\Delta\times\tau_0$ is a delay shorter than the sampling period T.

On the other hand, a small delay generated by the other ultrasonic probe B is expressed by Eq. (13) as follows:

$$\Delta\times\tau = h\tau_0 - hzT_0 = h(\tau_0 - zT_0) = h\Delta\times\tau_0 \quad (13)$$

Assume a case of replacing the standard ultrasonic probe A with the other ultrasonic probe B in which the sampling frequency fs of the latter is 1/h times that of the former, the transducer-array pitch P of the latter is h times that of the former, the focus distance r of the latter is h times that of the former and the number of interpolation points N of the latter is equal to that of the former. Since the delay accuracy is a function of ultrasonic wavelength, it is necessary to maintain the ultrasonic wavelength accuracy in order to maintain the delay accuracy. It is obvious from Eqs. (13) and (12) that the small delay time for the other ultrasonic probe B is h times that for the standard ultrasonic probe A. Since the sampling frequency fs of the other ultrasonic probe B is 1/h times that of the standard ultrasonic probe A, however, the sampling period of the other ultrasonic probe B is also h times that of the standard ultrasonic probe B, nullifying the effect of any increase in small delay time on the time accuracy. As a result, the time accuracy, that is, the ultrasonic wavelength accuracy, remains the same. Since the ultrasonic wavelength accuracy remains the same, the delay accuracy also remains unchanged as well. As described above, in spite of the fact that the small delay time for the other ultrasonic probe B is h times that for the standard ultrasonic probe A, the sampling period of the other ultrasonic probe B is also h times that of the standard ultrasonic probe A, nullifying the effect of any increase in small delay time on the sampling-delay accuracy. As a result, the sampling-delay accuracy remains the same, making it unnecessary to change the delay data stored in the memory.

In the conventional ultrasonic diagnostic apparatus, it is necessary to store data for finding a focus of ultrasonic waves received by ultrasonic transducers of both the ultrasonic probes A and B in a memory. By using the ultrasonic diagnostic apparatus implemented by the third embodiment of the present invention as explained above, however, it is necessary to store only data for finding a focus of ultrasonic waves received by ultrasonic transducers of the standard ultrasonic probe A. Delay data for generating a focus of ultrasonic waves received by ultrasonic transducers to be used in the delay means 101 and interpolation data (or filtering data) to be used in the interpolating circuit 111 employed in the other ultrasonic probe B can be found by using the delay data for generating a focus of ultrasonic waves received by ultrasonic transducers used in the delay means 101 and interpolation data (or filtering data) used in the interpolating circuit 111 employed in the standard ultrasonic probe A as they are. As a result, the size of a memory for storing data for generating a focus of ultrasonic waves received by ultrasonic transducers in the other ultrasonic probe B can be reduced.

To explain this effect in detail, assume an ultrasonic diagnostic apparatus employing three ultrasonic probes each comprising m ultrasonic transducers. In the case of the conventional ultrasonic diagnostic apparatus, as many as 3×m pieces of data for generating a focus of ultrasonic waves received by ultrasonic transducers are required. With the ultrasonic diagnostic apparatus provided by the third embodiment of the present invention, on the other hand, only (m+2) pieces of data for generating a focus of ultrasonic waves received by ultrasonic transducers are required, showing a decrease in data-piece count from the 3×m pieces.

If the sampling frequency of the other ultrasonic probe B is set at the same value as that of the standard ultrasonic probe A, the delay data of the ultrasonic probe B becomes h times that of the ultrasonic probe A and the interpolation data of the ultrasonic probe B becomes equal to $h\tau_0 - zT_0$ which can not be found readily by only multiplication of the center-frequency ratio h. It is thus not desirable to set the sampling frequency of the other ultrasonic probe B at the same value as that of the standard ultrasonic probe A.

Fourth Embodiment

A fourth embodiment of the present invention is obtained by employing a broad-frequency-band ultrasonic probe in the ultrasonic diagnostic apparatus implemented by the first embodiment as shown in FIG. 2. The operation of the fourth embodiment is explained by referring to FIG. 2 as follows.

The use of a broad-frequency-band ultrasonic probe implies that the transducer-array pitch P of the other ultrasonic probe B is equal to the transducer-array pitch $P_0$ of the standard ultrasonic probe A employed in the first embodiment ($P=P_0$). The center frequencies of the other ultrasonic probe B and the standard ultrasonic probe A are f and $f_0$ respectively where $f=f_0/h$. The focus distance r from the reference ultrasonic transducer to the focus point and the sampling frequency fs of the other ultrasonic probe B are kept at the same values as the focus distance $r_0$ from the reference ultrasonic transducer to the focus point and the sampling frequency $fs_0$ of the standard ultrasonic probe A ($r=r_0$ and $f=fs_0$). In this case, the structure of the other ultrasonic probe B remains the same as that of the standard ultrasonic probe A. In addition, as is obvious from Eqs. 1 and 2 and Eqs. 4 to 7, the delay-time data for generating a focus of ultrasonic waves received by ultrasonic transducers remains unchanged.

As a result, the use of a broad-frequency-band ultrasonic probe does not entail any change in configuration shown in FIG. 2 except that the band of the received signal to the ultrasonic probe employed in the ultrasonic diagnostic apparatus implemented by the first embodiment as shown in FIG. 2 becomes broader, be the ultrasonic probe the standard one A or the other one B. That is to say, the functions of the standard and other ultrasonic probes A and B can be executed by a single broad-frequency-band ultrasonic probe having a broader frequency band.

Thus, even if a broad-frequency-band ultrasonic probe is employed in the ultrasonic diagnostic apparatus implemented by the first embodiment as shown in FIG. 2, the data for a standard transmission/reception frequency can be used as it is for another transmission/reception frequency provided the focus distance and the sampling frequency remain unchanged. If the focus distance remains unchanged but the sampling frequency changes in dependence upon a transmission/reception-frequency ratio h as is the case with a 90-degree sample, however, the sampling frequency for the other transmission/reception frequency can be set at a value equal to 1/h times that of the standard transmission/reception frequency where h is a ratio of the standard transmission/reception frequency to the other transmission/reception frequency. In this case, focus data for forming received ultrasonic beams at the other transmission/reception frequency can be found by dividing the focus data for forming received ultrasonic beams at the standard transmission/reception frequency by the transmission/reception-frequency ratio h. It is thus necessary to store only data for generating a focus of ultrasonic waves received by the ultrasonic transducers at the standard transmission/reception frequency. Focus data for forming received ultrasonic beams at the other transmission/reception frequency can be found by either calculating the focus data for forming received ultrasonic beams at the standard transmission/reception frequency by the transmission/reception-frequency ratio h, or by using the data for generating a focus of ultrasonic waves received by the ultrasonic transducers at the standard transmission/reception frequency as it is. To be more specific, it is thus necessary to store only the transmission/reception-frequency ratio h in the ultrasonic probe-data storing unit 114a and to store only data for generating a focus of ultrasonic waves received by the ultrasonic transducers at the standard transmission/reception frequency in the focus-data storing unit 114b. Data for generating a focus of ultrasonic waves received by the ultrasonic transducers at the other transmission/reception frequency can be found by either calculating the data for generating a focus of ultrasonic waves received by the ultrasonic transducers at the standard transmission/reception frequency read out from the focus-data storing unit 114b by the transmission/reception-frequency ratio h stored in the ultrasonic probe-data storing unit 114a, or using the focus data for forming received ultrasonic beams at the standard transmission/reception frequency read out from the focus-data storing unit 114b as it is.

As a result, since the amount of data to be stored in the focus-data storing unit 114b can be reduced, there is resulted in an effect that the size of the focus-data storing unit 114b can also be decreased as well.

To explain this effect in detail, assume an ultrasonic diagnostic apparatus employing three ultrasonic probes each comprising m ultrasonic transducers. In the case of the conventional ultrasonic diagnostic apparatus, as many as 3×m pieces of data for generating a focus of ultrasonic waves received by the ultrasonic transducers are required. With the ultrasonic diagnostic apparatus provided by the fourth embodiment of the present invention, on the other hand, only m pieces of data for generating a focus of ultrasonic waves received by the ultrasonic transducers are required, showing a decrease in data-piece count from the 3×m pieces.

Fifth Embodiment

A fifth embodiment of the present invention is obtained by employing a broad-frequency-band ultrasonic probe in the ultrasonic diagnostic apparatus implemented by the second embodiment as shown in FIG. 3. The operation of the fifth embodiment is explained by referring to FIG. 3 as follows.

The use of a broad-frequency-band ultrasonic probe implies that the transducer-array pitch P of the other ultrasonic probe B is equal to the transducer-array pitch P0 of the standard ultrasonic probe A employed in the second embodiment ($P=P_0$). The focus distance r from the reference ultrasonic transducer to the focus point and the sampling frequency fs of the other ultrasonic probe B are kept at the same values as the focus distance $r_0$ from the reference ultrasonic transducer to the focus point and the sampling frequency $fs_0$ of the standard ultrasonic probe A ($r=r_0$ and $fs=fs_0$). In this case, the structure of the other ultrasonic probe B remains the same as that of the standard ultrasonic probe A. In addition, as is obvious from Eqs. 1 to 7, the delay-time data for generating a focus of ultrasonic waves received by the ultrasonic transducers remains unchanged. That is to say, the functions of the standard and other ultrasonic probes A and B can be executed by a single broad-frequency-band ultrasonic probe having a broader frequency band.

It is obvious from Eqs. (2) and (5) that the delay time remains unchanged. On the other hand, the phase-rotation angle changes as $\phi=\phi_0/h$ (substituting $f_0/h$ for f and $\tau_0$ for $\tau$ in Eq. (9)). Refer to Eq. (9). If the sampling frequency fs is changed to $fs_0/h$, the period T is changed to $hT_0$. Substituting $hT_0$ for T in Eq. (6) yields a delay time $A=A_0/h$. The phase data remains unchanged ($\phi=\phi_0/h$). Refer to Eq. (9).

Thus, if only the center frequency of the broad-frequency-band ultrasonic transducers is changed, by providing a means for dividing data by the transmission/reception-frequency ratio h, it becomes not necessary to store pieces of phase-rotation data for another transmission/reception frequency used in the ultrasonic diagnostic apparatus implemented by the fifth embodiment as data for generating a focus of ultrasonic waves received by the ultrasonic transducers at the other transmission/reception frequency as is the case with the ultrasonic diagnostic apparatus implemented by the second embodiment described earlier.

Obtained by employing a broad-frequency-band ultrasonic probe in the ultrasonic diagnostic apparatus implemented by the second embodiment as shown in FIG. 3, the fifth embodiment of the present invention exhibits the following effect. In the conventional ultrasonic diagnostic apparatus, it is necessary to store data for generating a focus of ultrasonic waves received by the ultrasonic transducers of each center frequency of the broad-frequency-band ultrasonic transducers. By using the ultrasonic diagnostic apparatus implemented by the fifth embodiment of the present invention as explained above, however, it is necessary to store only data for generating a focus of ultrasonic waves received by the ultrasonic transducers at the standard transmission/reception frequency. Data for generating a focus of ultrasonic waves received by the ultrasonic transducers at another transmission/reception frequency can be found by either calculating the data for finding a focus of ultrasonic waves received by the ultrasonic transducers at the standard transmission/reception frequency by the transmission/reception-frequency ratio h, where h is a ratio of the standard transmission/reception frequency to the other transmission/reception frequency as described above, or by using the data for generating a focus of ultrasonic waves received by the ultrasonic transducers at the standard transmission/reception frequency as it is. To be more specific, it is thus necessary to store only the transmission/reception-frequency ratio h in the ultrasonic probe-data storing unit 114a and to store only data for generating a focus of ultrasonic waves received by the ultrasonic transducers at the standard transmission/reception frequency in the focus-data storing unit 114b. Data for generating a focus of ultrasonic waves received by the ultrasonic transducers at the other transmission/reception frequency can be found by either multiplying the data for generating a focus of ultrasonic waves received by the ultrasonic transducers at the standard transmission/reception frequency read out from the focus-data storing unit 114b by the transmission/reception-frequency ratio h stored in the ultrasonic probe-data storing unit 114a, or using the data for finding a focus of ultrasonic waves received by the ultrasonic transducers at the standard transmission/reception frequency read out from the focus-data storing unit 114b as it is.

As a result, since the amount of data to be stored in the focus-data storing unit 114b can be reduced, there is resulted in an effect that the size of the focus-data storing unit 114b can also be decreased as well.

To explain this effect in detail, assume an ultrasonic diagnostic apparatus employing three ultrasonic probes each comprising m ultrasonic transducers. In the case of the conventional ultrasonic diagnostic apparatus, as many as 3×m pieces of data for generating a focus of ultrasonic waves received by ultrasonic transducers are required. With the ultrasonic diagnostic apparatus provided by the fifth embodiment of the present invention, on the other hand, only m pieces of data for generating a focus of ultrasonic waves received by ultrasonic transducers are required, showing a decrease in data-piece count from the 3×m pieces.

In the above description, the aperture of an ultrasonic probe, that is, the product of the number of ultrasonic transducers and the transducer-array pitch, is not prescribed specifically. It should be noted, however, that the present invention can also be applied to a case in which the center frequency of an ultrasonic probe having the largest aperture among a plurality of ultrasonic probes employed in an ultrasonic diagnostic apparatus as taken as a standard center frequency and the center-frequency ratio is defined as a ratio of the standard center frequency to the center frequency of an ultrasonic probe. In this case, however, the definition of the center-frequency ratio is not applicable to an ultrasonic probe having an aperture not smaller than that of an ultrasonic probe taken as a standard.

It should be noted that, while the present invention has been explained with reference to preferred embodiments, the explanation is not intended to be construed in a limiting sense. That is to say, a variety of changes and modifications can of course be made to the embodiments without departing from the true spirit and scope of the present invention.

For example, the amount of data for generating a focus of ultrasonic waves received by ultrasonic transducers can be reduced by using a technique other than what is described above, that is, a technique other than the wavefront sampling beam-forming method and the like. That is to say, it is possible to adopt a technique whereby the ultrasonic probe setting conditions and the usage conditions are normalized with respect to the center frequency or the center ultrasonic wavelength.

The entire disclosure of Japanese Patent Application No. 8-316233 filed on Nov. 27, 1996 including a specification, claims, drawings and a summary are incorporated herein by reference in its entirety.

In the above-mentioned inventions, a first storage means and a second storage means are different storage means or, one storage means so change the address or bank of memory, and probe data and focus data put in probe or focus data generator in an apparatus.

What is claimed is:

1. An ultrasonic diagnostic apparatus adapted for use with ultrasonic probes having different center frequencies each comprising a plurality of ultrasonic transducers each for transmitting and receiving an ultrasonic wave wherein focus data for forming received ultrasonic beams employed in each of said ultrasonic probes is used for converting said ultrasonic waves received by said ultrasonic transducers employed in said ultrasonic probe into pieces of digital received signal data and for delaying said pieces of digital received signal data by a predetermined delay time, and delayed pieces of digital received signal data are finally added up to form an ultrasonic image, said ultrasonic diagnostic apparatus further comprising:
a first storage means for storing focus data for forming received ultrasonic beams employed in a predetermined one of said ultrasonic probes;
a second storage means for storing a ratio of a center frequency of said predetermined one of said ultrasonic probes to a center frequency of another one of said ultrasonic probes; and
a calculation means for calculating focus data for forming received ultrasonic beams employed in said other ultrasonic probe from said data stored in said first storage means and said ratio stored in said second storage means to form an ultrasonic image from said ultrasonic waves received by said ultrasonic transducers employed in said other ultrasonic probe.

2. An ultrasonic diagnostic apparatus of a beam-forming type adapted for use with ultrasonic probes having different center frequencies each comprising a plurality of ultrasonic transducers each for transmitting and receiving an ultrasonic wave wherein focus data for forming received ultrasonic beams employed in each of said ultrasonic probes is used for converting said ultrasonic waves received by said ultrasonic transducers employed in said ultrasonic probe into pieces of digital received signal data, for multiplying each of said pieces of digital received signal data by a reference signal having the same frequency as a reception frequency, for delaying said pieces of digital received signal data of a difference-frequency component of a result of multiplying each of said pieces of digital received signal data by said reference signal and for carrying out a beam-forming process based on phase rotation on delayed pieces of digital received signal data, and said delayed pieces of digital received signal data completing said beam-forming process are finally added up to form an ultrasonic image, said ultrasonic diagnostic apparatus further comprising:
a first storage means for storing only focus data for forming received ultrasonic beams employed in a predetermined one of said ultrasonic probes;
a second storage means for storing a ratio of a center frequency of said predetermined one of said ultrasonic probes to a center frequency of another one of said ultrasonic probes; and
a calculation means for calculating focus data for forming received ultrasonic beams employed in said other ultrasonic probe from said data stored in said first storage means and said ratio stored in said second storage means to form an ultrasonic image from said ultrasonic waves received by said ultrasonic transducers employed in said other ultrasonic probe.

3. An ultrasonic diagnostic apparatus of a beam-forming type adapted for use with ultrasonic probes having different center frequencies each comprising a plurality of ultrasonic transducers each for transmitting and receiving an ultrasonic wave wherein focus data for forming received ultrasonic beams employed in each of said ultrasonic probes is used for focusing said ultrasonic waves received by said ultrasonic transducers employed in said ultrasonic probe into pieces of digital received signal data by sampling each of said ultrasonic waves at a sampling frequency equal to four times a center frequency of said ultrasonic waves and for reading out said pieces of digital received signal data of a predetermined delay time from a memory at a 90-degree phase after storing said pieces of digital received signal data in said memory, and delayed pieces of digital received signal data are finally added up to form an ultrasonic image by controlling the phase of a complex signal resulting from addition of said delayed pieces of digital received signal data, said ultrasonic diagnostic apparatus further comprising:
a first storage means for storing only focus data for forming received ultrasonic beams employed in a predetermined one of said ultrasonic probes;
a second storage means for storing a ratio of a center frequency of said predetermined one of said ultrasonic probes to a center frequency of another one of said ultrasonic probes; and
a calculation means for calculating focus data for forming received ultrasonic beams employed in said other ultrasonic probe from said data stored in said first storage means and said ratio stored in said second storage means to form an ultrasonic image from said ultrasonic waves received by said ultrasonic transducers employed in said other ultrasonic probe.

4. An ultrasonic diagnostic apparatus of a beam-forming type adapted for use with ultrasonic probes having different center frequencies each comprising a plurality of ultrasonic transducers each for transmitting and receiving an ultrasonic wave wherein focus data for forming received ultrasonic beams employed in each of said ultrasonic probes is used for converting a plurality of said analog ultrasonic waves received by said ultrasonic transducers each into a digital signal by means of a plurality of analog-to-digital converters, for reading out said digital received signals from a memory to delay said digital received signals by reading timing after storing said digital received signals in said memory and for forming an ultrasonic beam by implementing interpolation to produce a small delay by setting coefficients of a filter, said ultrasonic diagnostic apparatus further comprising:
a first storage means for storing only focus data for forming received ultrasonic beams employed in a predetermined one of said ultrasonic probes;
a second storage means for storing a ratio of a center frequency of said predetermined one of said ultrasonic probes to a center frequency of another one of said ultrasonic probes; and
a calculation means for calculating focus data for forming received ultrasonic beams employed in said other ultrasonic probe from said data stored in said first storage means and said ratio stored in said second storage means to form an ultrasonic image from said ultrasonic waves received by said ultrasonic transducers employed in said other ultrasonic probe.

5. An ultrasonic diagnostic apparatus according to claim 1 wherein, when said other ultrasonic probe with a center frequency equal to 1/h times said center frequency of said predetermined ultrasonic probe is used, a transducer-array pitch of said other ultrasonic probe is set at a value equal to h times that of said predetermined ultrasonic probe, a focus distance of said other ultrasonic probe is set at a value equal to h times that of said predetermined ultrasonic probe and a sampling frequency of said other ultrasonic probe is set at a value equal to 1/h times that of said predetermined ultrasonic probe.

6. An ultrasonic diagnostic apparatus of a beam-forming type adapted for use with ultrasonic probes having different center frequencies each comprising a plurality of ultrasonic transducers each for transmitting and receiving an ultrasonic wave wherein focus data for forming received ultrasonic beams employed in each of said ultrasonic probes is used for focusing said ultrasonic waves received by said ultrasonic transducers employed in said ultrasonic probe into pieces of digital received signal data, for multiplying each of said pieces of digital received signal data by a reference signal having the same frequency as a reception frequency, for delaying said pieces of digital received signal data of a difference-frequency component of a result of multiplying each of said pieces of digital received signal data by said reference signal and for carrying out a beam-forming process based on phase rotation on delayed pieces of digital received signal data, and said delayed pieces of digital received signal data completing said beam-forming process are finally added up to form an ultrasonic image, said ultrasonic diagnostic apparatus further comprising:
a first storage means for storing only focus data for forming received ultrasonic beams employed in a predetermined one of said ultrasonic probes;
a second storage means for storing a ratio of a center frequency of said predetermined one of said ultrasonic probes to a center frequency of another one of said ultrasonic probes; and
a calculation means for calculating focus data for forming received ultrasonic beams employed in said other ultrasonic probe from said data stored in said first storage means and said ratio stored in said second storage means to form an ultrasonic image from said ultrasonic waves received by said ultrasonic transducers employed in said other ultrasonic probe, wherein, when said other ultrasonic probe with a center frequency equal to 1/h times said center frequency of said predetermined ultrasonic probe is used, a transducer-array pitch of said other ultrasonic probe is set at a value equal to h times that of said predetermined ultrasonic probe, a focus distance of said other ultrasonic probe is set at a value equal to h times that of said predetermined ultrasonic probe and a sampling frequency of said other ultrasonic probe is set at a value equal to that of said predetermined ultrasonic probe.

7. An ultrasonic diagnostic apparatus according to claim 6 wherein, when said other ultrasonic probe with a center frequency equal to 1/h times said center frequency of said predetermined ultrasonic probe is used, time-delay data for generating a focus of ultrasonic waves received by said ultrasonic transducers employed in said other ultrasonic probe is found by multiplying that for said predetermined ultrasonic probe by h and phase-rotation data of said predetermined ultrasonic probe is used as that for said other ultrasonic probe as it is.

8. An ultrasonic diagnostic apparatus of a beam-forming type adapted for use with ultrasonic probes having different center frequencies each comprising a plurality of ultrasonic transducers each for transmitting and receiving an ultrasonic wave wherein focus data for forming received ultrasonic beams employed in each of said ultrasonic probes is used for focusing said ultrasonic waves received by said ultrasonic transducers employed in said ultrasonic probe into pieces of digital received signal data, for multiplying each of said pieces of digital received signal data by a reference signal having the same frequency as a reception frequency, for delaying said pieces of digital received signal data of a difference-frequency component of a result of multiplying each of said pieces of digital received signal data by said reference signal and for carrying out a beam-forming process based on phase rotation on delayed pieces of digital received signal data, and said delayed pieces of digital received signal data completing said beam-forming process are finally added up to form an ultrasonic image, said ultrasonic diagnostic apparatus further comprising:
a first storage means for storing only data for finding a focus of said ultrasonic waves received by said ultrasonic transducers employed in a predetermined one of said ultrasonic probes;
a second storage means for storing a ratio of a center frequency of said predetermined one of said ultrasonic probes to a center frequency of another one of said ultrasonic probes; and
a calculation means for calculating data for finding a focus of said ultrasonic waves received by said ultrasonic transducers employed in said other ultrasonic probe from said data stored in said first storage means and said ratio stored in said second storage means to form an ultrasonic image from said ultrasonic waves received by said ultrasonic transducers employed in said other ultrasonic probe, wherein a transducer-array pitch, a focus distance and a sampling frequency of each of said ultrasonic probes are each given as a function of center frequency of said respective ultrasonic probe.

9. An ultrasonic diagnostic apparatus of a beam-forming type adapted for use with an ultrasonic probe comprising a plurality of ultrasonic transducers each capable of transmitting and receiving an ultrasonic wave at a plurality of transmission/reception frequencies wherein data for finding a focus of said ultrasonic waves received by said ultrasonic transducers at each of said transmission/reception frequencies in use is used for focusing said ultrasonic waves received by said ultrasonic transducers into pieces of digital received signal data and for delaying said pieces of digital received signal data by a predetermined delay time, and delayed pieces of digital received signal data are finally added up to form an ultrasonic image, said ultrasonic diagnostic apparatus further comprising:
- a first storage means for storing only focus data for forming received ultrasonic beams at a predetermined one of said transmission/reception frequencies;
- a second storage means for storing a ratio of said predetermined transmission/reception frequency to another transmission/reception frequency; and
- a calculation means for calculating focus data for forming received ultrasonic beams at said other transmission/reception frequency from said data stored in said first storage means and said ratio stored in said second storage means to form an ultrasonic image from said ultrasonic waves received by said ultrasonic transducers at said other transmission/reception frequency.

10. An ultrasonic diagnostic apparatus of a beam-forming type adapted for use with an ultrasonic probe comprising a plurality of ultrasonic transducers each capable of transmitting and receiving an ultrasonic wave at a plurality of transmission/reception frequencies wherein focus data for forming received ultrasonic beams at each of said transmission/reception frequencies is used for converting said ultrasonic waves received by said ultrasonic transducers into pieces of digital received signal data, for multiplying each of said pieces of digital received signal data by a reference signal having the same frequency as a reception frequency, for delaying said pieces of digital received signal data of a difference-frequency component of a result of multiplying each of said pieces of digital received signal data by said reference signal and for carrying out a beam-forming process based on phase rotation on delayed pieces of digital received signal data, and said delayed pieces of digital received signal data completing said beam-forming process are finally added up to form an ultrasonic image, said ultrasonic diagnostic apparatus further comprising:
- a first storage means for storing only focus data for forming received ultrasonic beams at a predetermined one of said transmission/reception frequencies;
- a second storage means for storing a ratio of said predetermined transmission/reception frequency to another transmission/reception frequency; and
- a calculation means for calculating focus data for forming received ultrasonic beams at said other transmission/reception frequency from said data stored in said first storage means and said ratio stored in said second storage means to form an ultrasonic image from said ultrasonic waves received by said ultrasonic transducers at said other transmission/reception frequency.

11. An ultrasonic diagnostic apparatus of a beam-forming type adapted for use with an ultrasonic probe comprising a plurality of ultrasonic transducers each capable of transmitting and receiving an ultrasonic wave at a plurality of transmission/reception frequencies wherein data for finding a focus of said ultrasonic waves received by said ultrasonic transducers at each of said transmission/reception frequencies is used for focusing said ultrasonic waves received by said ultrasonic transducers into pieces of digital received signal data by sampling each of said ultrasonic waves at a sampling frequency equal to four times a center frequency of said ultrasonic waves and for reading out said pieces of digital received signal data of a predetermined delay time from a memory at a 90-degree phase after storing said pieces of digital received signal data in said memory, and delayed pieces of digital received signal data are finally added up to form an ultrasonic image by controlling the phase of a complex signal resulting from addition of said delayed pieces of digital received signal data, said ultrasonic diagnostic apparatus further comprising:
- a first storage means for storing only focus data for forming received ultrasonic beams at a predetermined one of said transmission/reception frequencies;
- a second storage means for storing a ratio of said predetermined transmission/reception frequency to another transmission/reception frequency; and
- a calculation means for calculating focus data for forming received ultrasonic beams at said other transmission/reception frequency from said data stored in said first storage means and said ratio stored in said second storage means to form an ultrasonic image from said ultrasonic waves received by said ultrasonic transducers at said other transmission/reception frequency.

12. An ultrasonic diagnostic apparatus according to claim 9 wherein, if the value of said other transmission/reception frequency in use is equal to 1/h times said predetermined transmission/reception frequency, a sampling frequency for said other transmission/reception frequency is set at a value equal to a 1/h times a sampling frequency for said predetermined transmission/reception frequency.

13. An ultrasonic diagnostic apparatus according to claim 10 wherein, if the value of said other transmission/reception frequency in use is equal to 1/h times said predetermined transmission/reception frequency, time-delay data for finding a focus of ultrasonic waves received by said ultrasonic transducers and phase-rotation data are found by multiplying those for said predetermined transmission/reception frequency by 1/h.

14. An ultrasonic diagnostic apparatus according to claim 11 or 12 wherein, if the value of said other transmission/reception frequency in use is equal to 1/h times said predetermined transmission/reception frequency, time-delay data for finding a focus of ultrasonic waves received by said ultrasonic transducers for said other transmission/reception frequency is found by multiplying that for said predetermined transmission/reception frequency by 1/h.

15. An ultrasonic diagnostic apparatus according to claim 8 wherein, if the value of said other transmission/reception frequency in use is equal to 1/h times said predetermined transmission/reception frequency, a sampling frequency for said other transmission/reception frequency is set at a value equal to that for said predetermined transmission/reception frequency.

16. An ultrasonic diagnostic apparatus according to claim 9 wherein, if the value of said other transmission/reception frequency in use is equal to 1/h times said predetermined transmission/reception frequency, phase-rotation data for said other transmission/reception frequency is found by multiplying that for said predetermined transmission/reception frequency by 1/h.

* * * * *